(12) United States Patent
Shin et al.

(10) Patent No.: US 10,988,168 B2
(45) Date of Patent: Apr. 27, 2021

(54) STEER-BY-WIRE-TYPE STEERING APPARATUS

(71) Applicant: MANDO CORPORATION, Gyeonggi-do (KR)

(72) Inventors: Woo Jin Shin, Gyeonggi-do (KR); JeongRae Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 242 days.

(21) Appl. No.: 16/351,514

(22) Filed: Mar. 13, 2019

(65) Prior Publication Data

US 2019/0291776 A1    Sep. 26, 2019

(30) Foreign Application Priority Data

Mar. 20, 2018 (KR) .................. 10-2018-0032070

(51) Int. Cl.
*B62D 5/04* (2006.01)
(52) U.S. Cl.
CPC ........... *B62D 5/0463* (2013.01); *B62D 5/043* (2013.01)
(58) Field of Classification Search
CPC ......... B62D 5/04; B62D 5/0403; B62D 5/043
See application file for complete search history.

(56) References Cited

U.S. PATENT DOCUMENTS

| 7,587,961 B1 | 9/2009 | Chiang |
| 2009/0320649 A1 | 12/2009 | Hu |
| 2019/0389503 A1* | 12/2019 | Hwang ................ B62D 5/0469 |
| 2020/0130733 A1* | 4/2020 | Hwang ................ B62D 5/001 |
| 2020/0391784 A1* | 12/2020 | Saito ..................... F16D 27/118 |

FOREIGN PATENT DOCUMENTS

| JP | 2004-338501 | 12/2004 |
| JP | 2006-2805 | 1/2006 |
| JP | 2007-106139 | 4/2007 |
| JP | 2007-118786 | 5/2007 |

(Continued)

OTHER PUBLICATIONS

Office Action dated May 2, 2019 for Korean Patent Application No. 10-2018-0032070 and its English machine translation by Google Translates.

(Continued)

*Primary Examiner* — Kevin Hurley
(74) *Attorney, Agent, or Firm* — Ladas & Parry, LLP

(57) ABSTRACT

The present embodiments relate to a steer-by-wire-type steering apparatus. The present embodiments may provide a steer-by-wire-type steering apparatus including: a locking member coupled to a shaft of a reaction motor and having locking teeth formed on an outer circumferential surface thereof; a pair of rotation-preventing members pivotally coupled by hinge axes at one ends thereof and having locking protrusions, which are supported by the locking teeth, formed at the opposite ends thereof; a cam rotatably coupled to a shaft of a driving motor so as to pivot the rotation-preventing members and having one side provided with one of a fixing recess and a fixing member inserted into the fixing recess; and a cam holder having one side, which faces the one side of the cam, provided with the other of the fixing recess and the fixing member.

19 Claims, 10 Drawing Sheets

(56) References Cited

FOREIGN PATENT DOCUMENTS

| KR | 10-0655329 | 12/2006 |
| KR | 10-0841668 | 6/2008 |
| KR | 101993280 B1 * | 6/2019 |
| WO | 2014/068633 | 5/2014 |

OTHER PUBLICATIONS

Notice of Allowance dated Sep. 24, 2019 for Korean Patent Application No. 10- 2018-0032070 and its English machine translation by Google Translates.

* cited by examiner

STEER-BY-WIRE-TYPE STEERING APPARATUS

CROSS REFERENCE TO RELATED APPLICATION

This application claims priority from Korean Patent Application No. 10-2018-0032070, filed on Mar. 20, 2018, which is hereby incorporated by reference for all purposes as if fully set forth herein.

BACKGROUND OF THE INVENTION

1. Field of the Invention

The present embodiments relate to a steer-by-wire-type steering apparatus, and more particularly, to a steer-by-wire-type steering apparatus capable of preventing rotation of a steering shaft if a driver applies a steering torque on the steering shaft in excess of a reaction torque of a reaction motor.

2. Description of the Prior Art

In general, power steering has been developed and applied as a steering apparatus of a vehicle in order to assist a driver in operating a steering wheel, thereby facilitating the driving operation. Hydraulic-type power steering using hydraulic pressure, electro-hydraulic-type power steering using both hydraulic pressure and the electric power of a motor, and electric-type power steering using only the electric power of a motor have been developed and applied.

In recent years, a steer-by-wire (SBW)-type steering apparatus, which enables steering of a vehicle using an electric device, such as a motor, while removing mechanical coupling devices, such as a steering column, a universal joint, or a pinion shaft between a steering wheel and wheels, has been developed and applied.

However, since the steer-by-wire-type steering apparatus has no mechanical connections between the steering shaft and the wheels, the steering wheel may be capable of being rotated endlessly by the driver, thereby deteriorating the steering sensation of the driver.

That is, if the turning of the wheel reaches a maximum point (when the steering wheel or the wheel is in the fully turned state in the general steering apparatus), or if the wheel can no longer turn because the wheel comes into contact with the curb, it is necessary to provide related information to the driver by preventing further rotation of the steering shaft.

SUMMARY OF THE INVENTION

Therefore, the present embodiments have been made in the background described above and provide a steer-by-wire-type steering apparatus capable of preventing rotation of a steering shaft if the driver generates steering torque on the steering shaft in excess of a reaction torque of a reaction motor.

Further, the present disclosure is not limited to the above aspect, and other unmentioned aspects of the present disclosure may be clearly appreciated by those skilled in the art from the following descriptions.

The present embodiments may provide a steer-by-wire-type steering apparatus including: a locking member or lock coupled to a shaft of a reaction motor and having locking teeth formed on an outer circumferential surface thereof; a pair of rotation-preventing members or levers pivotably coupled by hinge axes at one ends thereof and having locking protrusions, which are supported by the locking teeth, formed at the opposite ends thereof; a cam rotatably coupled to a shaft of a driving motor so as to pivot the rotation-preventing members or levers and having one side provided with one of a fixing recess and a fixing member or extension inserted into the fixing recess; and a cam holder having one side, which faces the one side of the cam, provided with the other of the fixing recess and the fixing member or extension.

According to the embodiments described above, the steer-by-wire-type steering apparatus has the effect of preventing rotation of a steering shaft if the driver applies a steering torque in excess of a reaction torque of a reaction motor on the steering shaft.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
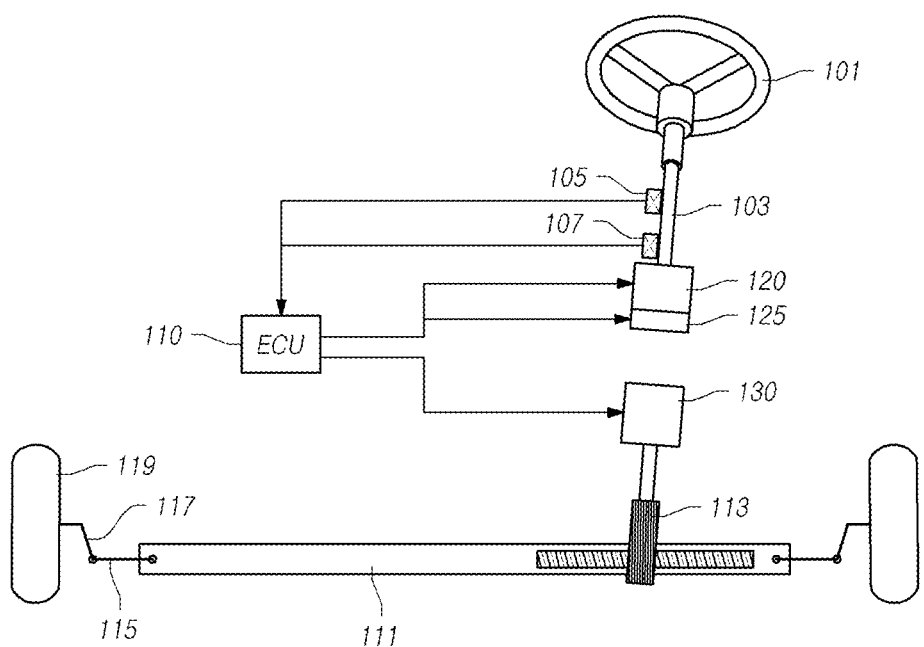
FIG. 1 is a schematic view illustrating the configuration of a steer-by-wire-type steering apparatus according to the present embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. It should be noted that when it is described in the specification that one component is "connected," "coupled" or "joined" to another component, a third component may be "connected," "coupled," and "joined" between the first and second components, although the first component may be directly connected, coupled or joined to the second component.

Figure 2:
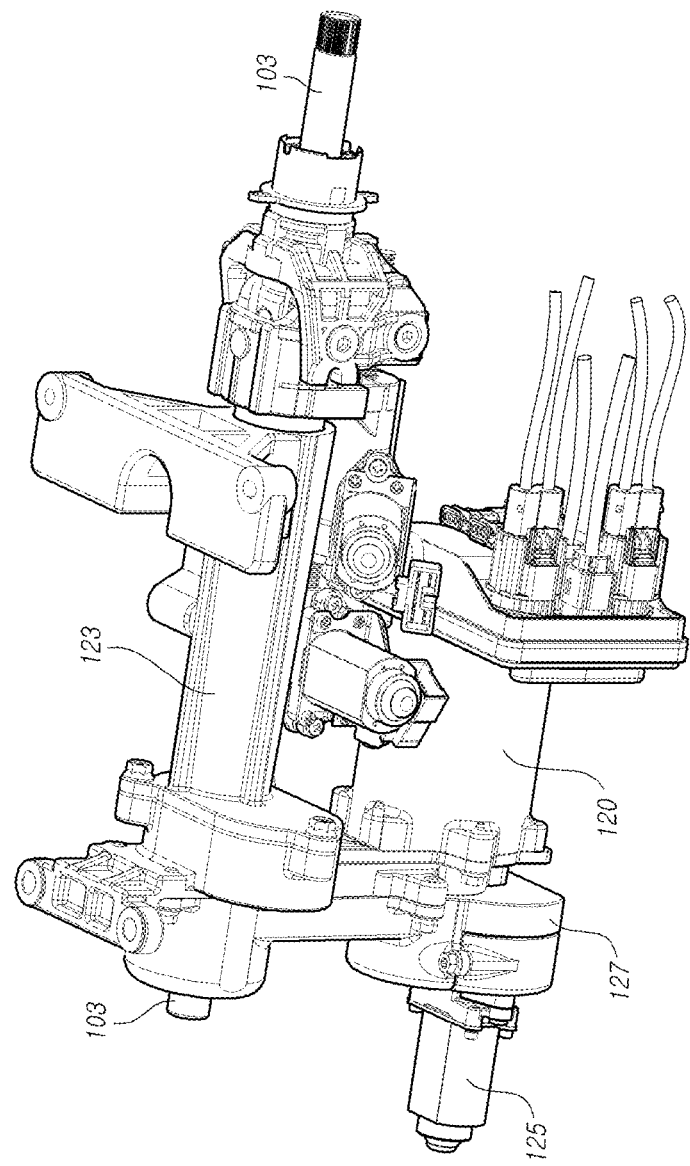
FIG. 2 is a perspective view illustrating a part of a steer-by-wire-type steering apparatus according to the present embodiments.
Figure 3:
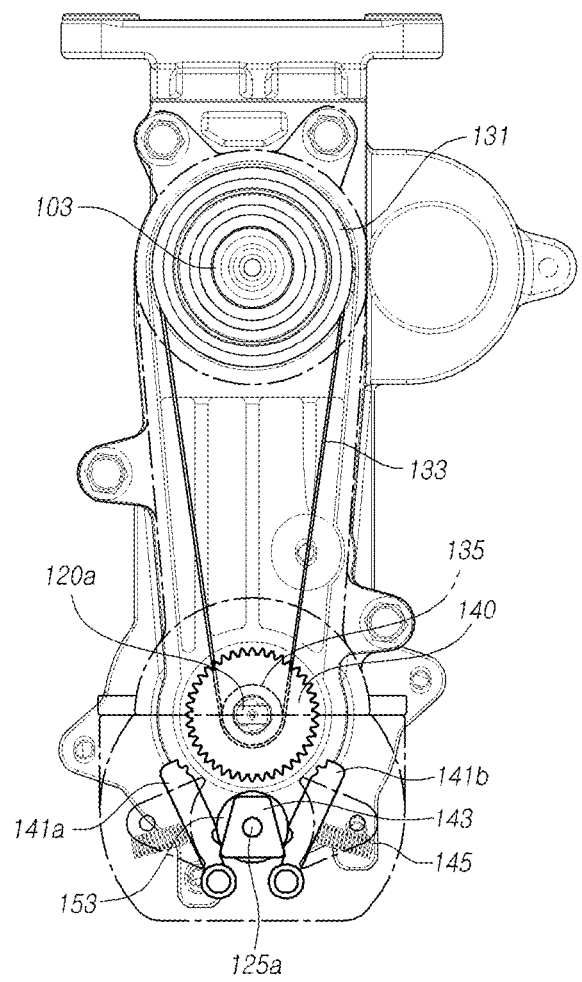
FIG. 3 is a front view illustrating a part of a steer-by-wire-type steering apparatus according to the present embodiments.
Figure 4:
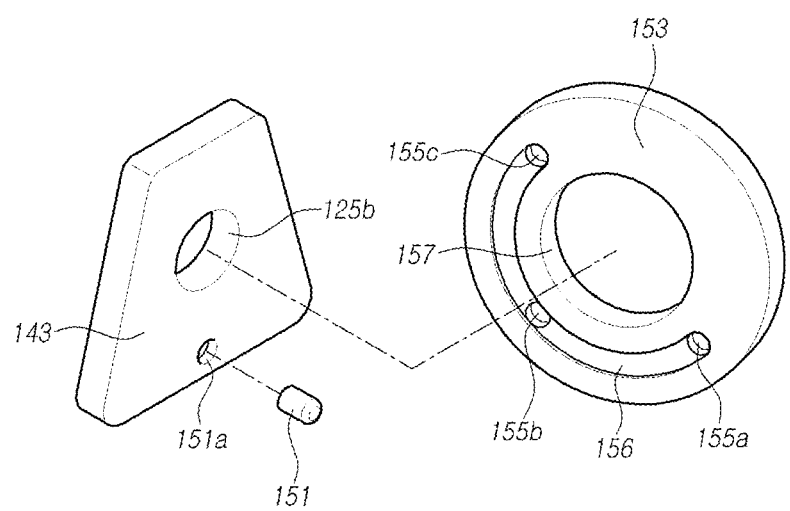
FIG. 4 is an exploded perspective view illustrating a part of a steer-by-wire-type steering apparatus according to the present embodiments.
Figure 5:
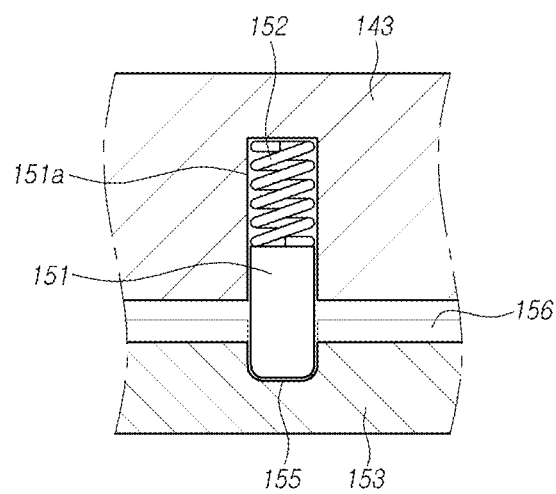
FIG. 5 is a sectional view illustrating a part of a steer-by-wire-type steering apparatus according to the present embodiments.

FIG. 1 is a schematic view illustrating the configuration of a steer-by-wire-type steering apparatus according to the present embodiments. FIG. 2 is a perspective view illustrating a part of a steer-by-wire-type steering apparatus according to the present embodiments. FIG. 3 is a front view illustrating a part of a steer-by-wire-type steering apparatus according to the present embodiments. FIG. 4 is an exploded perspective view illustrating a part of a steer-by-wire-type steering apparatus according to the present embodiments. FIG. 5 is a sectional view illustrating a part of a steer-by-wire-type steering apparatus according to the present embodiments. FIGS. 6 to 10 are front views illustrating a part of a steer-by-wire-type steering apparatus according to the present embodiments.

As shown in the above drawings, the steer-by-wire-type steering apparatus according to the present embodiments includes a locking member or lock 140 coupled to a shaft 120a of a reaction motor 120 and having locking teeth 140a formed on the outer circumferential surface thereof, a pair of rotation-preventing members or levers 141a and 141b pivotably coupled to a housing 127 by hinge axes 149 at one ends thereof and having locking protrusions 141c formed to be supported by the locking teeth 140a at the opposite ends thereof so as to be supported by the locking teeth 140a at one side and the other side of the locking member or lock 140, respectively, a cam 143 mounted between the rotation-preventing members or levers 141a and 141b, rotatably coupled to a shaft 125a of a driving motor 125 so as to pivot the rotation-preventing members or levers 141a and 141b about the hinge axes 149, and having one side provided with one of a fixing recesses 155a, 155b, or 155c and a fixing member or extension 151 inserted into the fixing recess 155a, 155b, or 155c, and a cam holder 153 having one side, which faces the one side of the cam 143, provided with the other of the fixing recess 155a, 155b, or 155c and the fixing member or extension 151.

The steer-by-wire-type steering apparatus according to the present embodiments include an angle sensor 105 and a torque sensor 107, which are coupled to one side of a steering shaft 103 connected to a steering wheel 101, and the angle sensor 105 and the torque sensor 107 detect the operation of the steering wheel 101 by the driver and transmit electric signals to an electronic control unit 110, thereby operating the reaction motor 120 and a pinion shaft motor 130.

The electronic control unit 110 controls the reaction motor 120, the driving motor 125, and the pinion shaft motor 130 based on electric signals transmitted from the angle sensor 105 and the torque sensor 107 and based on electric signals transmitted from various sensors mounted to the vehicle.

The pinion shaft motor 130 slides a rack bar 111, which is connected to the pinion shaft 113, thereby performing steering of wheels 119 by means of a tie rod 115 and a knuckle arm 117, and the reaction motor 120 generates steering-reaction force in the opposite direction when the driver operates the steering wheel 101 or performs operation of the steering shaft 103 while the vehicle is running autonomously.

Although the drawings of the present embodiments illustrate the steering shaft 103 having the angle sensor 105 and the torque sensor 107 for the convenience of explanation, motor position sensors, a variety of radar, camera image sensors, and the like for transmitting steering information to the electronic control unit 110 may be provided, a detailed description of which will be omitted below.

Since the steering shaft 103 and the pinion shaft 113 are not mechanically connected to each other in the steer-by-wire-type steering apparatus described above, the steering wheel 101 may be rotated endlessly by the operation of the driver. Thus, mechanical limitation is required in order to stop the rotation of the steering shaft 103 at a certain angle.

That is, if the turning of the wheel 119 reaches a maximum point (when the steering wheel 101 or the wheel 119 is in the fully turned state in the general steering apparatus), or if the wheel 119 can no longer turn because the wheel comes into contact with the curb, the reaction motor 120 outputs the maximum reaction torque. Therefore, it is possible to prevent the steering shaft 103 from being rotated further in order to provide such information to the driver.

In order to prevent the rotation of the steering shaft 103, the driving motor 125 is provided such that it is mechanically connected to the steering shaft 103 so that if a steering torque equal to or greater than the maximum reaction torque of the reaction motor 120 is generated, the rotation-preventing members or levers 141a and 141b are operated so as to stop the rotation of the steering shaft 103.

A steering column 123 fixed to the chassis of a vehicle is provided with the steering shaft 103 coupled to the steering wheel 101. In addition, the reaction motor 120, providing steering-reaction force to the steering shaft 103, and the driving motor 125 operating to stop the rotation of the steering shaft 103 if a steering torque equal to or greater than the maximum reaction torque of the reaction motor 120 is generated on the steering shaft 103, are provided at both sides of a housing 127 at one side of the steering column 123.

A first pulley 131 is coupled to the steering shaft 103 and a second pulley 135 is coupled to the shaft 120a of the reaction motor 120. The first pulley 131 and the second pulley 135 are connected by means of a belt 133.

Therefore, if the driver operates the steering wheel 101, the electronic control unit 110 operates the reaction motor 120 based on signal values detected by the torque sensor 107 and the angle sensor 105, thereby generating reaction torque in the direction opposite the rotational direction of the steering shaft 103.

In addition, the locking member or lock 140 having the locking teeth 140a formed continuously on the outer circumferential surface thereof is coupled to the shaft 120a of the reaction motor 120 so as to be rotated along with the shaft 120a of the reaction motor 120. A pair of rotation-preventing members or levers 141a and 141b for restricting the rotation of the locking member or lock 140 is provided.

One end of each of the rotation-preventing members or levers 141a and 141b is fixed to the housing 127, which accommodates the first pulley 131 and the second pulley 135 therein, by means of the hinge axis 149 so as to pivot, and the opposite ends of the rotation-preventing members 141a and 141b have the locking protrusions 141c that are supported by the locking teeth 140a of the locking member or lock 140.

In addition, the opposite ends of the rotation-preventing members or levers 141a and 141b are provided so as to be supported by the locking teeth 140a on one side and the other side of the locking member or lock 140, respectively.

Figure 10:
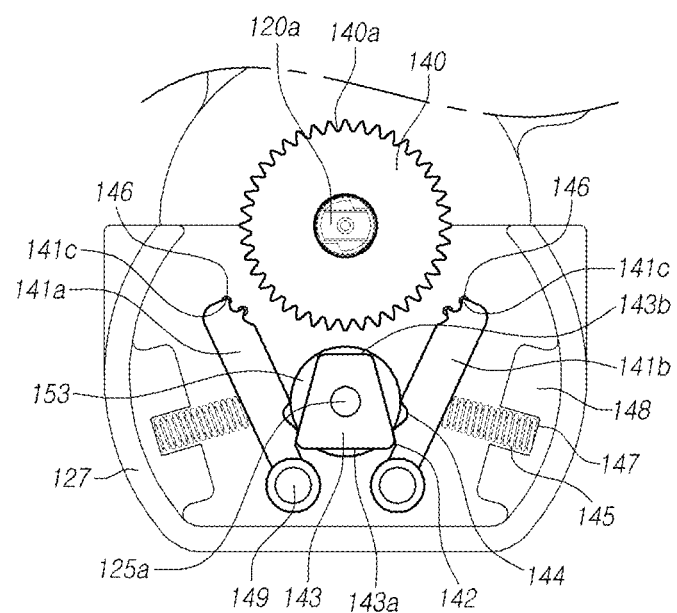

As shown in FIG. 10, a rolling member or tip 146 resting on the locking teeth 140a may be rotatably coupled to the end of the locking protrusion 141c. When the locking member or lock 140 and the rotation-preventing members or levers 141a and 141b are in the connected state while rotating with respect to each other, the rolling member or tip 146 is able to prevent the locking member or lock 140 and the rotation-preventing members or levers 141a and 141b from being damaged or deformed by colliding with each other and is able to reduce noise therefrom.

A ball, a roller, or the like may be used as the rolling member or tip 146, and a ball or a roller may be rotatably coupled to the end of the locking protrusion 141c by a hinge-coupling method or the like.

In addition, the cam 143 for pivoting the rotation-preventing members or levers 141a and 141b about the respective hinge axes 149 is mounted between one ends of the rotation-preventing members or levers 141a and 141b, and the cam 143 is coupled to the shaft 125a of the driving motor 125 so as to be rotated.

In addition, resilient members or braces 145 for resiliently supporting the rotation-preventing members or levers 141a and 141b toward the locking member or lock 140 are coupled to the inner surface of the housing 127 so that the rotation-preventing members or levers 141a and 141b are biased inwards based on the hinge axes 149 unless the cam 143 opens the rotation-preventing members or levers 141a and 141b outwards.

A support recess 147 is formed in the inner surface of the housing 127 such that the resilient member 145 is inserted into and supported by the support recess 147. The support recess 147 may be formed in a protruding end portion 148 protruding from the inner surface of the housing 127.

The cam 143 has a predetermined thickness and has a first portion 143a and a second portion 143b formed parallel to each other such that the first portion 143a is longer than the second portion 143b to thus form a trapezoidal shape. The rotation-preventing members or levers 141a and 141b pivot about the hinge axes 149 so as to be opened outwards or closed inwards according to the rotational position of the cam 143, so that the locking protrusions 141c are moved to engage with or disengage from the locking teeth 140a.

The cam 143 is mounted between the pair of rotation-preventing members or levers 141a and 141b while the shaft 125a of the driving motor 125 is connected to a mounting hole 125b thereof and rotates the rotation-preventing members or levers 141a and 141b about the hinge axes 149 so as to engage with or disengage from the locking member or lock 140.

In addition, one of the fixing recess 155a, 155b, or 155c and the fixing member or extension 151 inserted into the fixing recess 155a, 155b, or 155c is formed on one side of the cam 143, and the other of the fixing recess 155a, 155b, or 155c and the fixing member or extension 151 is provided on one side of the cam holder 153 mounted parallel to the cam 143 and spaced apart therefrom a predetermined distance.

Hereinafter, a description will be made of an example in which the fixing member or extension 151 is provided on one side of the cam 143 and the fixing recesses 155a, 155b, and 155c into which the fixing member or extension 151 is inserted are formed on one side of the cam holder 153 facing the one side of the cam 143, for the convenience of explanation, as shown in the drawings of the present embodiments.

In addition, a support member or compressible brace 152 for resiliently supporting the fixing member or extension 151 so as to be inserted into or removed from the fixing recesses 155a, 155b, and 155c when the cam 143 rotates may be further provided, and the support member or compressible brace 152 is received in a coupling hole 151a formed in the cam 143 having the fixing member or extension 151 so as to resiliently support the fixing member or extension 151 toward the fixing recesses 155a, 155b, and 155c.

On the other hand, in the case where the fixing member or extension 151 is provided in the cam holder 153, the fixing member or extension 151 may be resiliently supported by forming the coupling hole in the cam holder 153.

The cam holder 153 may have a fixing hole 157 formed in the center thereof such that the shaft 125a of the driving motor passes through the fixing hole 157. The cam holder 153 may be fixed to a fixing portion of the housing 127, or may be integrally formed on the inner surface of the housing 127.

The fixing recesses 155a and 155c may be formed at both ends of a circular arc, respectively, conforming to the operation angle of the cam 143. Alternatively, the fixing recesses 155a and 155c may be formed at both ends of a circular arc, and at least one fixing recess 155b may be further provided on the circular arc between the both ends. The present embodiments will be described with reference to an example in which three fixing recesses are provided at both ends of the circular arc and between the both ends, respectively.

In addition, a guide groove 156 is formed between the fixing recesses 155a, 155b, and 155c in the circumferential direction based on the shaft 125a of the driving motor 125, which is the rotation center of the cam 143, so that the fixing member or extension 151 is guided along the rotational direction without escaping from the guide groove 156 when the cam 143 rotates.

Figure 6:
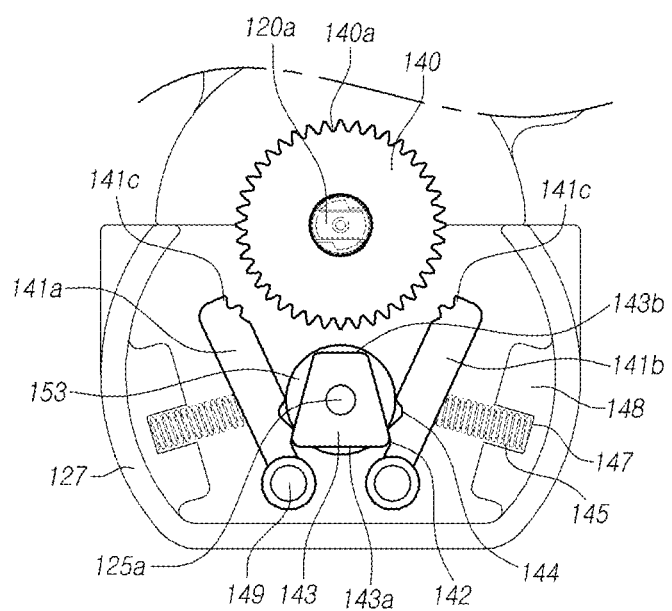
FIGS. 6 to 10 are front views illustrating a part of a steer-by-wire-type steering apparatus according to the present embodiments.

First, basic operation of the cam 143 will be described. As shown in FIG. 6, if both ends of the first portion 143a of the cam 143 are positioned at one ends of the rotation-preventing members or levers 141a and 141b, respectively, the rotation-preventing members or levers 141a and 141b are opened outwards based on the hinge axes 149, so that the resilient member 145 is compressed and the locking protrusions 141c are moved to disengage from the locking teeth 140a.

Figure 7:
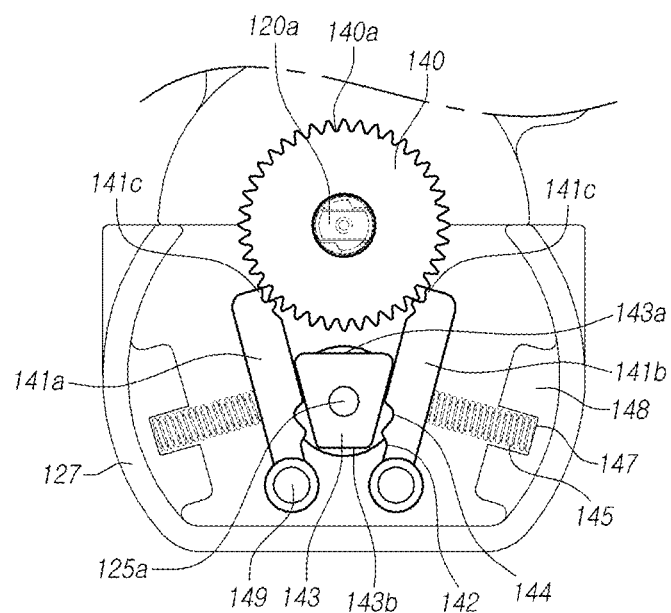

On the other hand, as shown in FIG. 7, if the second portion 143b of the cam 143 is positioned at the one ends of the rotation-preventing members or levers 141a and 141b, the rotation-preventing members or levers 141a and 141b are closed inwards based on the hinge axes 149 so that the resilient member 145 is restored and the locking protrusions 141c are moved to be inserted into the locking teeth 140a.

That is, if the two ends of the first portion 143a of the cam 143 are supported by the rotation-preventing members or levers 141a and 141b, the resilient members or braces 145 are compressed and the locking protrusions 141c are moved to disengage from the locking teeth 140a, and if the two ends of the first portion 143a of the cam 143 are not supported by the rotation-preventing members or levers 141a and 141b, the resilient members or braces 145 are restored and the locking protrusions 141c are moved to be inserted into the locking teeth 140a.

In addition, if the locking protrusions 141c engage with the locking teeth 140a, the steering shaft 103 is prevented from rotating, and if the locking protrusions 141c disengage from the locking teeth 140a, the steering shaft 103 can rotate.

In addition, rotation-support recesses 142 and 144 into which respective ends of the first portion 143a of the cam 143 are inserted are formed in the inner surfaces of one ends of the rotation-preventing members or levers 141a and 141b so that the rotation of the cam 143 is stopped at a specific position.

The rotation-support recesses 142 and 144 include first rotation-support recesses 142 formed in one ends of the rotation-preventing members or levers 141a and 141b and second rotation-support recesses 144 formed adjacent to the first rotation-support recesses 142 toward the opposite ends of the rotation-preventing members or levers 141a and 141b.

Therefore, if both ends of the first portion 143a of the cam 143 are inserted into the first rotation-support recess 142, the rotation-preventing members or levers 141a and 141b are opened outwards based on the hinge axes 149, so that the resilient members or braces 145 are compressed and the locking protrusions 141c disengage from the locking teeth 140a.

That is, if both ends of the first portion 143a of the cam 143 are inserted into and supported by the first rotation-support recesses 142, the fixing member or extension 151 is inserted into the fixing recess 155a provided at one end of the circular arc on the cam holder 153 and the locking protrusions 141c disengage from the locking teeth 140a.

In addition, if one end of the first portion 143a of the cam 143 is inserted into and supported by the second rotation-support recess 144 of one of the pair of rotation-preventing members or levers 141a and 141b, the fixing member or extension 151 is inserted into the fixing recess 155b provided between both ends of the circular arc on the cam holder 153 and the locking protrusion 141c of the rotation preventing member 141a or 141b supported by one end of the cam 143 is moved to disengage from the locking teeth 140a of the locking member or lock 140.

In addition, if the second portion 143b of the cam 143 is positioned at one ends of the rotation-preventing members or levers 141a and 141b, the fixing member or extension 151 is inserted into the fixing recess 155c provided at the other end of the circular arc on the cam holder 153 and the locking protrusions 141c of the pair of rotation-preventing members or levers 141a and 141b are moved to be inserted into the locking teeth 140a of the locking member or lock 140, thereby stopping the rotation of the steering shaft 103.

The steer-by-wire-type steering apparatus according to the present embodiments may further include a torque sensor 107 for measuring a steering torque value generated by the steering shaft 103 and an electronic control unit 110 for determining a reaction torque value of the steering shaft 103 based on the steering torque value measured by the torque sensor 107, transmitting the same to the reaction motor 120, comparing the steering torque value and a predetermined maximum reaction torque value, and determining whether or not to operate the driving motor 125.

If the steering torque value measured by the torque sensor 107 is less than a predetermined maximum reaction torque value, the electronic control unit 110 operates the driving motor 125 to rotate the cam 143 such that both ends of the first portion 143a of the cam 143 are inserted into and supported by the first rotation-support recesses 142 of the rotation-preventing members or levers 141a and 141b so that the locking protrusions 141c are moved to disengage from the locking teeth 140a.

In addition, if the steering torque value measured by the torque sensor 107 is greater than the predetermined maximum reaction torque value, the electronic control unit 110 operates the driving motor 125 to rotate the cam 143 such that the second portion 143b of the cam 143 is positioned at one ends of the rotation-preventing members or levers 141a and 141b so that the locking protrusions 141c are moved to engage with the locking teeth 140a.

That is, if a steering torque value in one direction (e.g., in the left-turn direction) is less than the maximum reaction torque value, the steering shaft 103 is maintained to be rotatable, and if a steering torque value in the left-turn direction is greater than the maximum reaction torque value, only the rotation of the steering shaft 103 in the left-turn direction is prevented, whereas the rotation of the steering shaft 103 in the right-turn direction, which is opposite the above direction, is allowed.

Figure 8:
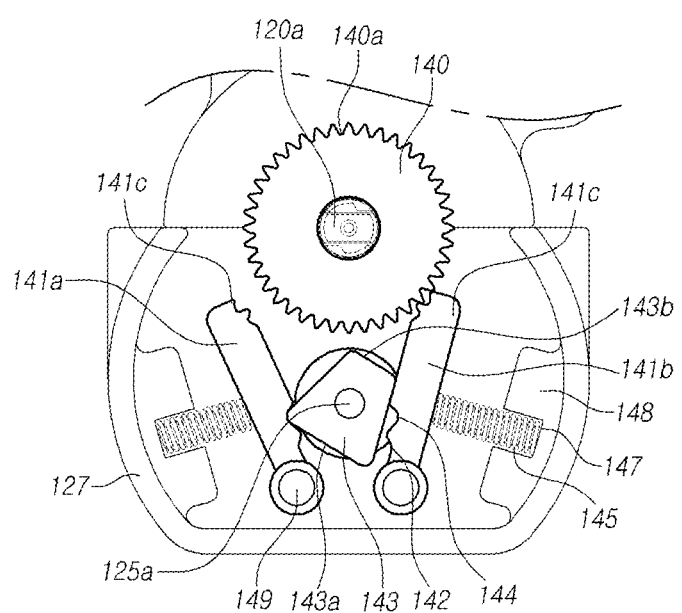

This will be described with reference to FIGS. 8 and 9. FIG. 8 shows the case where the steering torque value in the right-turn direction is greater than the maximum reaction torque value, whereby the locking member or lock 140 becomes incapable of rotating in the right-turn direction (clockwise in the drawing) but is capable of rotating in the left-turn direction (counterclockwise in the drawing). Here, the case where the locking member or lock 140 is incapable of rotating in the right-turn direction means that the steering shaft 103 connected to the shaft 120a of the reaction motor 120 by means of the first pulley 131 and the second pulley 135 is also incapable of rotating in the right-turn direction.

Figure 9:
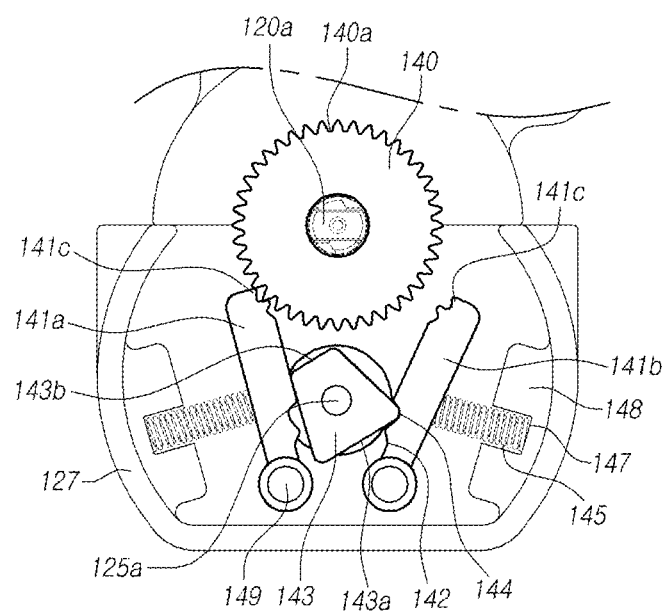

On the other hand, FIG. 9 shows the case where the steering torque value in the left-turn direction is greater than the maximum reaction torque value, wherein the locking member or lock 140 becomes incapable of rotating in the left-turn direction (counterclockwise in the drawing) but remains capable of rotating in the right-turn direction (clockwise in the drawing). Here, the case where the locking member or lock 140 is incapable of rotating in the left-turn direction means that the steering shaft 103 connected to the shaft 120a of the reaction motor 120 by means of the first pulley 131 and the second pulley 135 is also incapable of rotating in the left-turn direction.

That is, it is possible to perform control such that the steering shaft 103 is incapable of rotating only in one direction according to the direction in which the cam 143 is rotated by the driving motor 125 operated by the electronic control unit 110.

As described above, the steer-by-wire-type steering apparatus according to the present embodiments has an effect of preventing the rotation of a steering shaft if the driver applies a steering torque in excess of a reaction torque of a reaction motor on the steering shaft.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steer-by-wire-type steering apparatus comprising:
   a locking member coupled to a shaft of a reaction motor and having locking teeth formed on an outer circumferential surface thereof;
   a pair of rotation-preventing members pivotably coupled to respective hinge axes at respective first ends thereof and having locking protrusions, which engageably lock with the locking teeth, the locking protrusions formed at the respective second ends of the rotation-preventing members;

a cam rotatably coupled to a shaft of a driving motor so as to pivot the rotation-preventing members; and a cam holder having one side, which faces the one side of the cam, wherein one side of the cam is provided with one of a first fixing recess and a fixing extension, and the one side of the cam holder provided with the remaining one of the first fixing recess and the fixing extension, and wherein the fixing extension is located in the first fixing recess.

2. The apparatus of claim 1, wherein a rolling tip resting on the locking teeth is rotatably coupled to an end of the locking protrusion.

3. The apparatus of claim 2, wherein the rolling tip comprises a ball or a roller.

4. The apparatus of claim 1, wherein resilient braces resiliently support the rotation-preventing members toward the cam and the locking member and the resilient braces are coupled to an inner surface of a housing.

5. The apparatus of claim 4, wherein a support recess is formed in the inner surface of the housing such that at least one of the resilient braces is inserted into and supported by the support recess.

6. The apparatus of claim 1, further comprising a compressible brace that resiliently acts on the fixing extension and urges the fixing extension toward the first fixing recess.

7. The apparatus of claim 1, wherein the cam holder is formed integrally with the housing.

8. The apparatus of claim 1, wherein the cam or cam holder which comprises the first fixing recess further comprises a second fixing recess and optionally comprises at least one additional fixing recess, wherein the first and second fixing recesses are located at respective ends of a circular arc and the at least one additional fixing recess is located along the circular arc between the ends of the circular arc.

9. The apparatus of claim 8, wherein a guide groove is formed in a circumferential direction between the fixing recesses.

10. The apparatus of claim 1, wherein the cam has a trapezoidal shape with a first portion and a second portion forming two sides of the trapezoidal shape with the second portion having a first end and a second end, wherein first and second parts are formed to face each other and to be parallel to each other such that the first portion is longer than the second portion, and wherein in a first position of the cam, the first and second ends of the first portion are received into rotation-support recesses formed in inner surfaces of the respective first ends of the rotation-preventing members.

11. The apparatus of claim 10, wherein each of the rotation-support recesses comprises a first rotation-support recess formed in the first end of the respective rotation-preventing members and a second rotation-support recess formed adjacent to the first rotation-support recess toward an opposite end of the respective rotation-preventing members.

12. The apparatus of claim 11, wherein if both of the first and second ends of the first portion are inserted into and supported by the first rotation-support recesses, the fixing extension is inserted into the fixing recess provided at one end of a circular arc on the cam holder, and the locking protrusions are moved to disengage from the locking teeth.

13. The apparatus of claim 11, wherein in a second position of the cam, one end of the first portion is located in and supported by the second rotation-support recess of one of the pair of rotation-preventing members, the fixing extension is located in the at least one additional fixing recess on the cam holder, and the locking protrusion of the rotation-preventing member supported by one end of the cam is in a position to disengage from the locking teeth.

14. The apparatus of claim 11, wherein in a third position of the cam, the second portion is positioned at the first end of one of the rotation-preventing members, the fixing extension is located in the fixing recess provided at the other end of a circular arc on the cam holder, and the locking protrusions of the pair of rotation-preventing members are in a position to engage with the locking teeth.

15. The apparatus of claim 11, further comprising:
a torque sensor that measures a steering torque value generated in the steering shaft; and
an electronic control unit that determines a reaction torque value of the steering shaft based on the steering torque value measured by the torque sensor, transmitting the same to the reaction motor, comparing the steering torque value and a predetermined maximum reaction torque value, and determining whether or not to operate the driving motor.

16. The apparatus of claim 15, wherein if the steering torque value is less than the predetermined maximum reaction torque value, the electronic control unit operates the driving motor to rotate the cam such that both ends of the first portion are inserted into and supported by the first rotation-support recesses of the respective rotation-preventing members.

17. The apparatus of claim 15, wherein if the steering torque value is greater than the predetermined maximum reaction torque value, the electronic control unit operates the driving motor to rotate the cam such that both ends of the first portion are released from the respective first rotation-support recesses of the respective rotation-preventing members such that the second portion is positioned at the respective first ends of both of the rotation-preventing members.

18. The apparatus of claim 4, wherein the resilient brace is a spring.

19. The apparatus of claim 6, wherein the compressible brace is a spring.

* * * * *